(12) United States Patent
Choi et al.

(10) Patent No.: US 10,654,558 B2
(45) Date of Patent: May 19, 2020

(54) ROTOR HUB WITH ENFORCED COLLECTIVE CONING

(71) Applicant: Textron Innovations Inc., Fort Worth, TX (US)

(72) Inventors: Jouyoung Jason Choi, Southlake, TX (US); Frank B. Stamps, Colleyville, TX (US)

(73) Assignee: TEXTRON INNOVATIONS INC., Fort Worth, TX (US)

( * ) Notice: Subject to any disclaimer, the term of this patent is extended or adjusted under 35 U.S.C. 154(b) by 269 days.

(21) Appl. No.: 15/938,979

(22) Filed: Mar. 28, 2018

(65) Prior Publication Data

US 2019/0300152 A1    Oct. 3, 2019

(51) Int. Cl.
| | | |
|---|---|---|
| *B64C 11/06* | (2006.01) | |
| *B64C 11/14* | (2006.01) | |
| *B64C 29/00* | (2006.01) | |
| *B64C 11/00* | (2006.01) | |

(52) U.S. Cl.
CPC ............ *B64C 11/06* (2013.01); *B64C 11/008* (2013.01); *B64C 11/14* (2013.01); *B64C 29/0033* (2013.01)

(58) Field of Classification Search
CPC ....... B64C 11/06; B64C 11/008; B64C 11/14; B64C 29/0033; B64C 27/54; B64C 11/30; B64C 27/605; F05B 2240/2022; F03B 3/14
See application file for complete search history.

(56) References Cited

FOREIGN PATENT DOCUMENTS

WO    WO-2008073073 A2 *    6/2008    ........... B64C 27/605

* cited by examiner

*Primary Examiner* — Aaron R Eastman
(74) *Attorney, Agent, or Firm* — Patent Capital Group

(57) ABSTRACT

One example of a rotor assembly comprises: a rotor hub operable to rotate based on rotation of a mast; a first rotor blade pivotally attached to the rotor hub; a bracing member pivotally attached to the rotor hub at a first end and pivotally attached to the first rotor blade at a second end; and a linkage mechanism coupling the first rotor blade to a second rotor blade. The bracing member is operable to transfer a coning movement of the first rotor blade to a movement of the linkage mechanism and a corresponding coning movement of the second rotor blade.

20 Claims, 12 Drawing Sheets

ROTOR HUB WITH ENFORCED COLLECTIVE CONING

TECHNICAL FIELD

This disclosure relates generally to aircraft performance, and more particularly, though not exclusively, to flight rotor systems to improve the performance of the aircraft.

BACKGROUND

In aircraft such a rotorcraft and tiltrotor aircraft, a rotor system including rotor blades generates thrust to propel the aircraft. Engines rotates the mast, which, in turn, rotate the rotor system to generate the thrust. The rotor blades are subjected to various forces during operation. For example, as the rotor blades rotate centrifugal forces produce an axial force on each of the rotor blades (e.g., pulling it outwardly, perpendicular to the axis of rotation). In addition, because the blades generate the thrust, they may move out of plane or "cone" (e.g., in a direction perpendicular to the direction of rotation). Such coning movement is more pronounced when the rotor blades are accelerating (e.g., increasing rotational velocity to create more thrust and, thereby, increase the speed of the aircraft).

SUMMARY

In some examples, a rotor assembly comprises: a rotor hub operable to rotate based on rotation of a mast; a first rotor blade pivotally attached to the rotor hub; a bracing member pivotally attached to the rotor hub at a first end and pivotally attached to the first rotor blade at a second end; and a linkage mechanism coupling the first rotor blade to a second rotor blade. The bracing member is operable to transfer a coning movement of the first rotor blade to a movement of the linkage mechanism and a corresponding coning movement of the second rotor blade.

In other examples, tiltrotor aircraft comprises a mast configured to rotate based on torque applied by an engine; a first rotor blade pivotally attached to the rotor hub; a bracing member pivotally attached to the rotor hub at a first end and pivotally attached to the first rotor blade at a second end; and a linkage mechanism coupling the first rotor blade to a second rotor blade. The bracing member is operable to transfer a coning movement of the first rotor blade to a movement of the linkage mechanism and a corresponding coning movement of the second rotor blade.

In still other examples, a tiltrotor aircraft comprises a plurality of engines and a plurality of rotor assemblies. Each of the plurality of rotor assemblies comprises a rotor hub operable to rotate based on torque applied by one of the plurality of engines, a plurality of rotor blades pivotally attached to the rotor hub, a plurality of bracing members pivotally attached to the rotor hub at a first end and to pivotally attach to one of the plurality of rotor blades at a second end, and a linkage mechanism coupling the plurality of rotor blades to one another. One of the plurality of bracing members is operable to transfer a coning movement of one of the plurality of rotor blades to a movement of the linkage mechanism and a corresponding coning movement of others of the plurality of bracing members.

In other examples, a rotor assembly comprises a rotor hub, a plurality of rotor blades, a plurality of bracing members, a plate, and a plurality of linkage members. The rotor hub is configured to rotate based on rotation of a mast. Each of the plurality of rotor blades comprises a pivot point configured to pivotally attach to the rotor hub. Each of the plurality of bracing members is configured to pivotally attach to the rotor hub at a first end and to pivotally attach to one of the plurality of rotor blades at a second end. Each of the plurality of linkage members couples the plate to one of the plurality of rotor blades. The plate is configured to translate along the mast and to collectively move the plurality of rotor blades based on the translation.

DETAILED DESCRIPTION

Figure 1A:
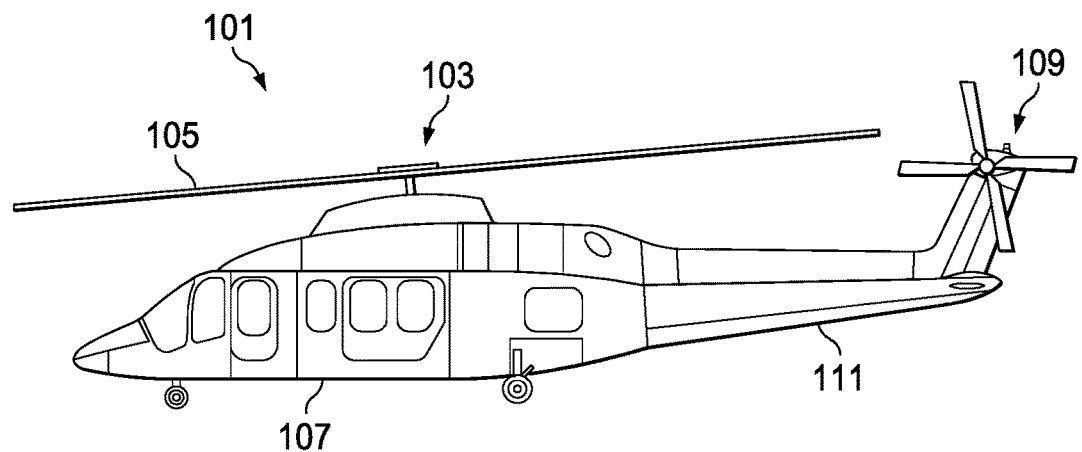
FIGS. 1A, 1B, and 2A and 2B illustrate example aircraft, in accordance with some embodiments of the present disclosure.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In the specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. In addition, it is noted that the terms "rotor system" and "rotor assembly" are used interchangeably in the present disclosure.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached Figures.

Figure 1B:
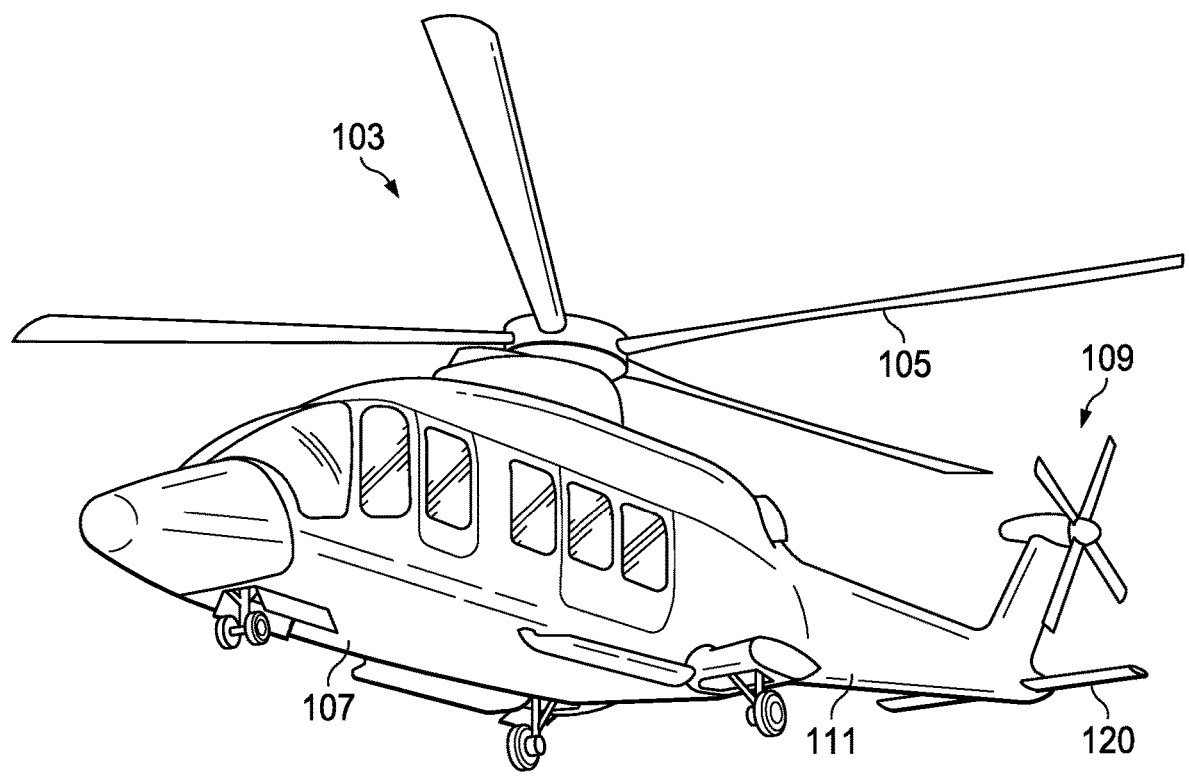

FIGS. 1A and 1B illustrate an example embodiment of an aircraft, which in this case is a rotorcraft 101. FIG. 1A illustrates a side view of the rotorcraft 101, while FIG. 1B illustrates a perspective view of the rotorcraft 101. Rotorcraft 101 includes an airframe (hidden beneath the outer mold line of the rotorcraft) and a rotor system 103 coupled to the airframe. The rotor system 103 comprises with a plurality of rotor blades 105 to generate thrust to propel the rotorcraft 101. The pitch of each rotor blade 105 can be managed or adjusted (either collectively or cyclically) to selectively control direction, thrust, and lift of the rotorcraft 101. During collective pitch, all the of rotor blades 105 collectively pitch together (i.e., a pitch angle is the same for all blades). When the rotor blades 105 cyclically pitch, an angle of each rotor blades varies depending on where it is in a cycle of rotation (i.e., at some points in the rotation the pitch angle is not the same for all blades). Rotorcraft 101 further includes a fuselage 107, tail rotor or anti-torque system 109, an empennage 111, and a tail structure 120, each of which is attached to the airframe. The tail structure 120 may be used as a horizontal stabilizer. Torque is supplied to rotor system 103 and anti-torque system 109 using at least one engine.

Figure 2A:
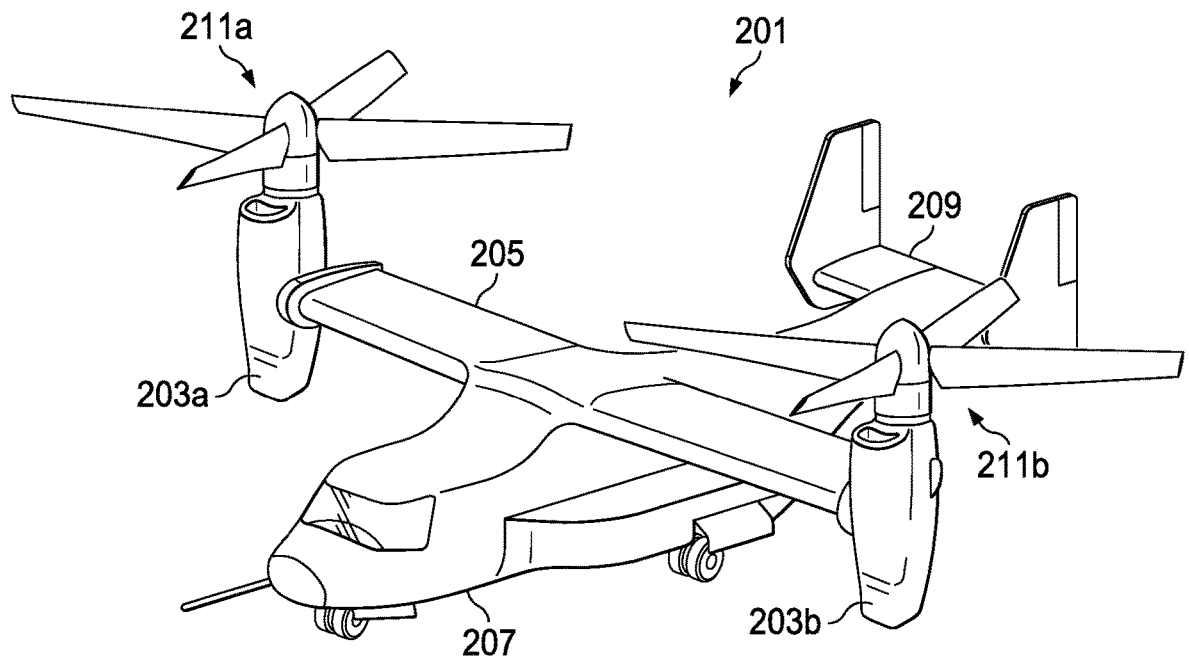
Figure 2B:
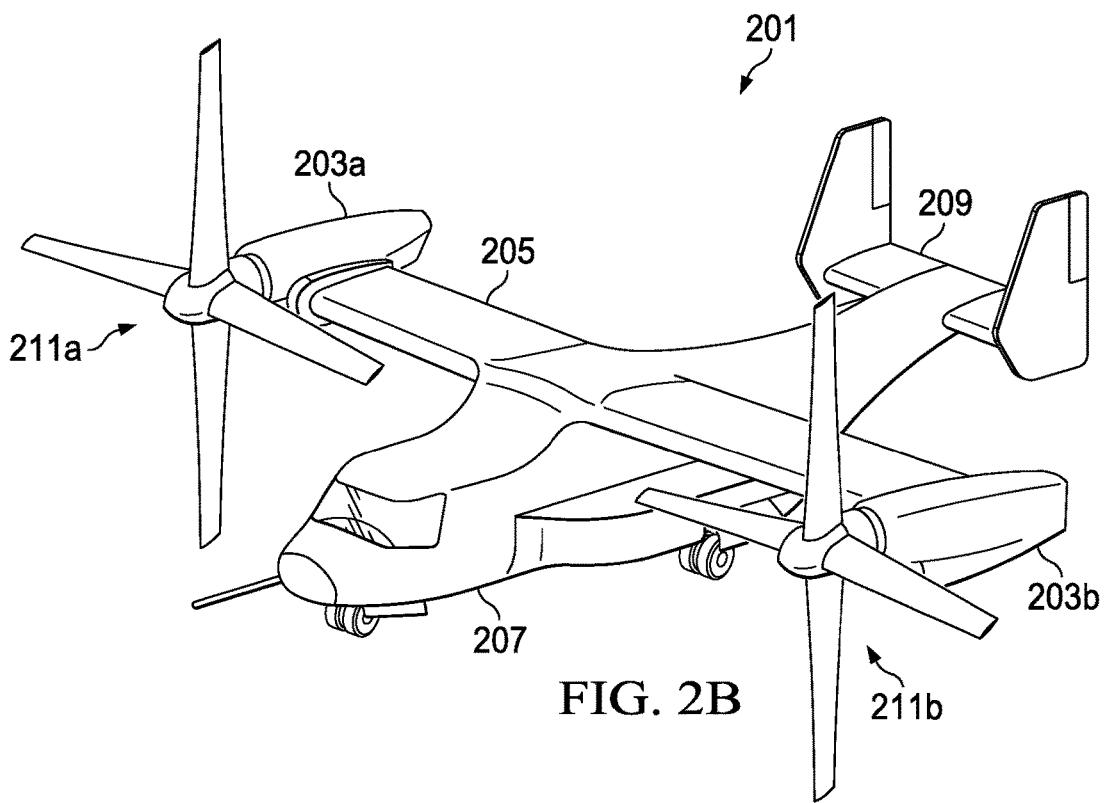

FIGS. 2A and 2B illustrate perspective views of an example an aircraft, which in this case is a tiltrotor aircraft 201. Tiltrotor aircraft 201 can include nacelles 203a and 203b, a wing 205, a fuselage 207, and a tail member 209, each of which is coupled to an airframe of the tiltrotor aircraft 201 (hidden beneath the outer mold line of the tiltrotor aircraft 201). Each nacelle 203a and 203b can include an engine and gearbox for driving rotor systems (tiltrotors) 211a and 211b, respectively, to generate thrust to propel the tiltrotor aircraft 201. A pitch of each rotor blade can be managed or adjusted (either collectively or cyclically) to selectively control direction, thrust, and lift of the tiltrotor aircraft 201. During collective pitch, all the of rotor blade collectively pitch together (i.e., a pitch angle is the same for all blades). When the rotor blades cyclically pitch, an angle of each rotor blades varies depending on where it is in a cycle of rotation (i.e., at some points in the rotation the pitch angle is not the same for all blades). A rotor disc is a generally elliptical area in which the thrust is developed under the rotating rotor blades. Nacelles 203a and 203b are each configured to rotate between a helicopter mode, in which the nacelles 203a and 203b (and the corresponding rotor systems 211a and 211b) are approximately vertical, and an airplane mode, in which the nacelles 203a and 203b (and the corresponding rotor systems 211a and 211b) are approximately horizontal. FIG. 2A illustrates the tiltrotor aircraft 201 in the helicopter mode in which the nacelles 203a and 203b and the rotor systems 211a and 211b are approximately vertical. FIG. 2B illustrates the tiltrotor aircraft 201 in the airplane mode in which the nacelles 203a and 203b and the rotor systems 211a and 211b are approximately horizontal.

It should be appreciated that the rotorcraft 101 of FIGS. 1A and 1B and tiltrotor aircraft 201 of FIGS. 2A and 2B are merely illustrative of a variety of aircraft that can be used to implement embodiments of the present disclosure. Other aircraft implementations can include, for example, fixed wing airplanes, hybrid aircraft, unmanned aircraft, gyrocopters, a variety of helicopter configurations, and drones, among other examples. In addition, several Figures of the present disclosure illustrate rotor assemblies in a vertical orientation only for simplicity. The Figures and the corresponding descriptions are applicable to any type of aircraft (e.g., the Figures and the corresponding descriptions are applicable tiltrotor aircraft regardless of whether the tiltrotor aircraft are in helicopter mode or in airplane mode). Moreover, it should be appreciated that even though aircraft are particularly well suited to implement embodiments of the present disclosure, the described embodiments can also be implemented using non-aircraft vehicles and devices.

Rotor systems (e.g., rotor system 103 on the rotorcraft 101 and rotor systems 211a and 211b of the tiltrotor aircraft 201) are a major source of vibrations affecting an aircraft. The engines (and transmission) apply a torque to the rotor system to rotate the rotor blades at a rotational frequency (or "$\Omega$"). During operation, when all the rotor blades of the rotor system are rotating, the rotor blades collectively cause structures supporting the blades (e.g., a mast supporting the blades, an airframe to which the mast is attached) to vibrate. The frequency of such vibrations is sometimes referred to as N per revolution (commonly abbreviated and referred to herein as "N-per-rev") and is a function of, among other things, the number of blades, "N", in the rotor system (i.e., assuming identical rotor blades are equally spaced around a rotor hub and moving at a constant rotational velocity). The N-per-rev is a frequency that is an integer multiple of the rotational frequency, $\Omega$, of the rotor system, where the integer is the number of blades in the system. For example, a rotor system operating at a rotational frequency of 5 Hz and comprising 3 blades has an N-per-rev equal to 3*5 Hz or 15 Hz. Likewise, a rotor system operating at the same rotational frequency and comprising 5 blades has an N-per-rev equal to 5*5 Hz or about 25 Hz. The operational frequency is also referred to as 1-per-rev. Other integer multiples of the rotational frequency can have a dramatic impact on the vibration of components of an aircraft. For example, 2-per-rev is 2× the rotational frequency, which in the above example is 2*5 or 10 Hz; the 3-per-rev is 32× the rotational frequency, which in the above example is 2*5 or 10 Hz; etc. While the other vibration components contribute to overall vibrations of the aircraft, in many cases, 1-per-rev is a dominant source of vibrations (e.g., in terms of design loads). Any aircraft component that has a first natural frequency that is approximately equal to 1-per-rev is likely to resonate during operation of the aircraft, which could cause catastrophic failure of the component. Aircraft components are designed to have a first natural frequency that is either above or below 1-per-rev.

Figure 3:
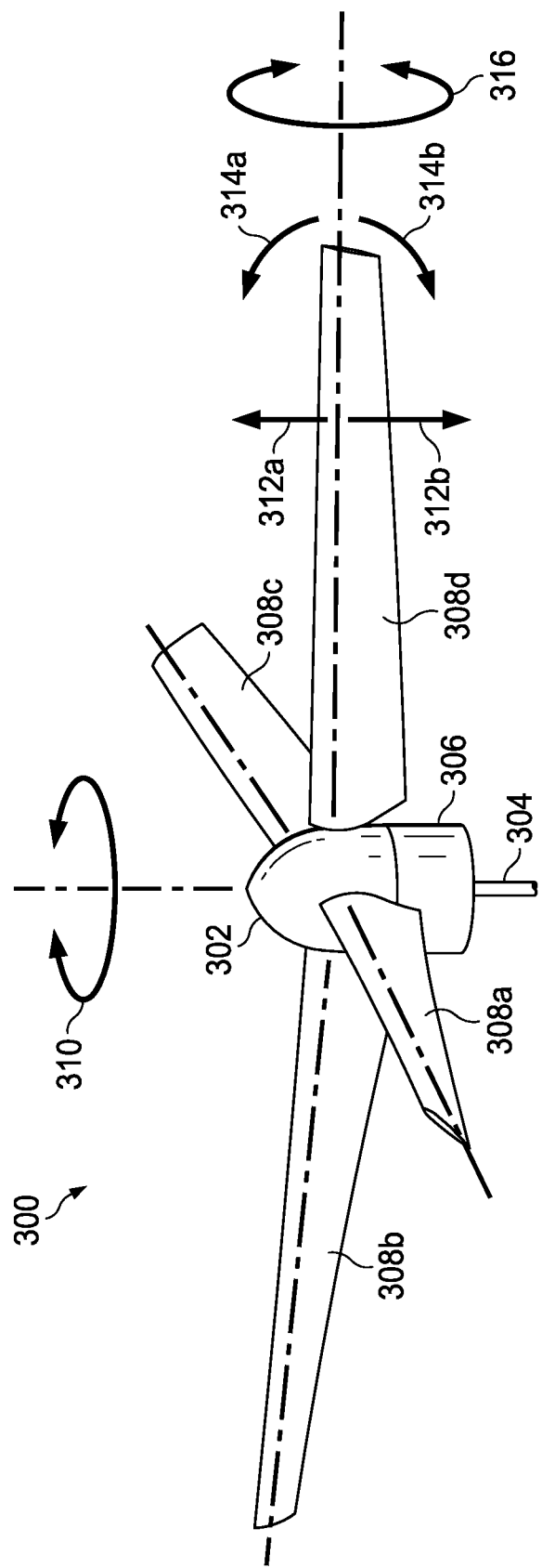
FIG. 3 illustrates a rotor assembly, in accordance with some embodiments of the present disclosure.

FIG. 3 illustrates a rotor assembly 300, in accordance with some embodiments of the present disclosure. The rotor assembly 300 comprises a mast 304, a fixed housing 306, a shell 302 (or spinner), and a plurality of rotor blades 308 (i.e., rotor blades 308a, 308b, 308c, and 308d). The mast 304 is configured to rotate based on torque applied by an engine. The rotation of a mast causes the rotor hub and the shell 302 to rotate about an axis of the hub (e.g., as generally indicated by arrow 310, which may be clockwise or counterclockwise). The fixed housing 306 remains fixed (e.g., does not rotate) during operation of the rotor system. The shell 302 encloses, among other things, a rotor hub (and an assembly of component coupled thereto) and includes openings through which a root of each of the rotor blades 308 extend. Each of the rotor blades 308 includes: a feathering axis (or pivot change axis) about which the rotor blade can pivot about its axial length (e.g., as generally indicated by rotation arrow 316, which may be clockwise or counterclockwise), a rotational axis (collinear with the axis of the hub) about which the rotor blade rotates during operation (e.g., as generally indicated by rotation arrows 314a and 314b), a hinge about which the rotor blade may flap (e.g., as generally indicated by arrows 312a and 312b). It is also noted that leading and/or lagging forces may be generated as generally indicated by arrows 314a and 314b. As will be described further detail below, the rotor assembly 300 includes bracing members and a linkage mechanism that transfers a coning movement of one rotor blade to a movement of the linkage mechanism and a corresponding coning movement of the remaining rotor blades.

In general, rotor systems may be categorized based on an in-plane 1st natural frequency and an out-of-plane 1st natural frequency. The in-plane 1st natural frequency is measured in the plane of rotation of the rotor blades (i.e., in the plane e.g., as generally indicated by rotation arrows 314a and 314b). The out-of-plane 1st natural frequency is measured in a plane perpendicular to the plane of rotation of the rotor blades (i.e., in a plane e.g., as generally indicated by rotation arrows 314a and 314b, which is vertical in the pictured orientation). A rotor system is considered "stiff" when the 1st natural frequency is above 1-per-rev and is considered "soft" when the 1st natural frequency is blow 1-per-rev. A rigid rotor system is one that is stiff both in-plane and out-of-plane (i.e., the in-plane 1st natural frequency and the out-of-plane 1st natural frequency are each above 1-per-rev). A stiff in-plane rotor system is one that is stiff in-plane and soft out-of-plane (i.e., the in-plane 1st natural frequency is above 1-per-rev and the out-of-plane 1st natural frequency is below 1-per-rev).

Some rotorcraft always fly with the rotor blades rotor oriented edgewise (e.g., as illustrated in FIGS. 1A and 1B). In contrast, tiltrotor aircraft can fly in helicopter mode or in airplane mode (e.g., as illustrated in FIGS. 2A and 2B). When a tiltrotor aircraft flies in airplane mode (e.g., with a soft in-plane rotor system), the stability of the rotor system is largely determined by a relationship between the pitch of the rotor blades and flapping of the rotor blades (i.e., pitch-flap coupling) (sometimes referred to as delta-three). In practice, delta-three may be implemented in an aircraft by changing of the pitch of the blades as a function of flapping (e.g., a sine function relates the pitch angle and the flap angle). Delta-three is used to balance the thrust generated by the rotor system and to limit flapping angles (i.e., because the pitch angle can counteract the effect of flapping). Delta-three is expressed in terms of (positive or negative) degrees. Negative degrees of delta-three means that the pitch angle of the blades increases as the rotor blades flap up (i.e., away from the mast), and the pitch angle of the blades decreases as the rotor blades flap down (i.e., toward from the mast). Positive degrees of delta-three means that the pitch angle of the blades increases as the rotor blades flap down (i.e., toward from the mast), and the pitch angle of the blades decreases as the rotor blades flap up (i.e., away from the mast). As an example of a tiltrotor aircraft flying in airplane mode: if the rotor system begins to flap and nothing forces it to come back to a neutral position, then the rotor system may tilt and/or nutate, which can snowball and cause a catastrophic failure of the tiltrotor aircraft. However, a degree of delta-three can be used to mechanically induce a restoring force (a response to flapping) that causes the rotors of a tiltrotor aircraft to become stable.

Delta-zero is a relationship between the pitch of the rotor blades and collective coning of the rotor blades (i.e., pitch-cone coupling). In practice, delta-zero may be implemented in an aircraft by changing of the pitch of the blades as a function of coning (e.g., a sine function relates the pitch angle and the coning angle). For example, a distance between the pitch-cone coupling mechanism (i.e., a joint between a pitch horn and a pitch link) and a pitch change axis of a rotor blade may set the relationship between pitching coning (i.e., delta-zero). Delta-zero is expressed in terms of (positive or negative) degrees. Negative degrees of delta-zero means that the pitch angle of the blades increases as the rotor blades cone up (i.e., away from the mast), and the pitch angle of the blades decreases as the rotor blades cone down (i.e., toward from the mast). Positive degrees of delta-zero means that the pitch angle of the blades decreases as the rotor blades cone up (i.e., away from the mast), and the pitch angle of the blades increases as the rotor blades cone down (i.e., toward from the mast).

Figure 4A:
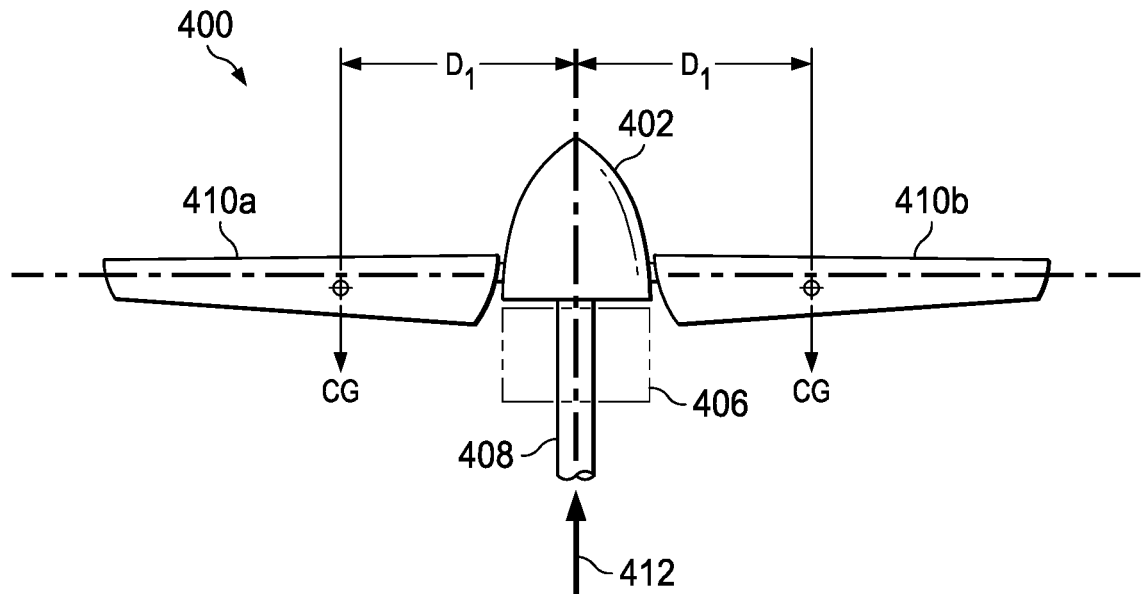
FIGS. 4A, 4B, 4C, and 4D illustrate various positions of rotor blades based on pitch control, in accordance with some embodiments of the present disclosure.

Both rigid rotor systems and stiff in-plane rotor system may use cyclical pitch to control an aircraft. FIGS. 4A, 4B, 4C, and 4D illustrate various positions of rotor blades of rotor systems based on pitch control. It is noted that the FIGS. 4A, 4B, 4C, and 4D are simplified and only show two rotor blades only for simplicity and clarity of the illustration. In each case, the rotor systems include three or more blades (i.e., with the remaining blade(s) not visible in the view provided by the Figures). In each of the FIGS. 4A, 4B, 4C, and 4D, a rotor system 400 comprises a mast 408, a rotating housing 402, a stationary housing 406, and rotor blades 410a and 410b (and one or more other blades, not shown for clarity). The rotor blades 410a and 410b are rotating about the housing based on rotation of the mast 408. When no pitch control is applied to the rotor blades (regardless of whether the rotor system is rigid or stiff in-plane), the rotor blades do not cone (i.e., have a zero-degree coning angle as measured relative to a line perpendicular to the mast). Rotor blades may cone in response to the thrust produced by their rotation. In general, coning can fall into one of two regimes: collective coning or differential coning. When collective coning, all rotor blades in a rotor system cone together (e.g., they all cone at a same coning angle). When differential coning (flapping), the rotor blades in the rotor system can cone at angles that are different from one another. FIG. 4A illustrates the rotor system 400 wherein the rotor blades 410a and 410b have a zero-degree coning angle. In this case the center of gravity (CG) of each of the rotor blades 410a and 410b is equidistant from a centerline of the mast 408 (i.e., each is a distance D1 from the centerline of the mast 408). Thus, the thrust vector 412 generated by the rotation of the rotor blades 410a and 410b is collinear with the centerline of the mast 408.

Figure 4B:
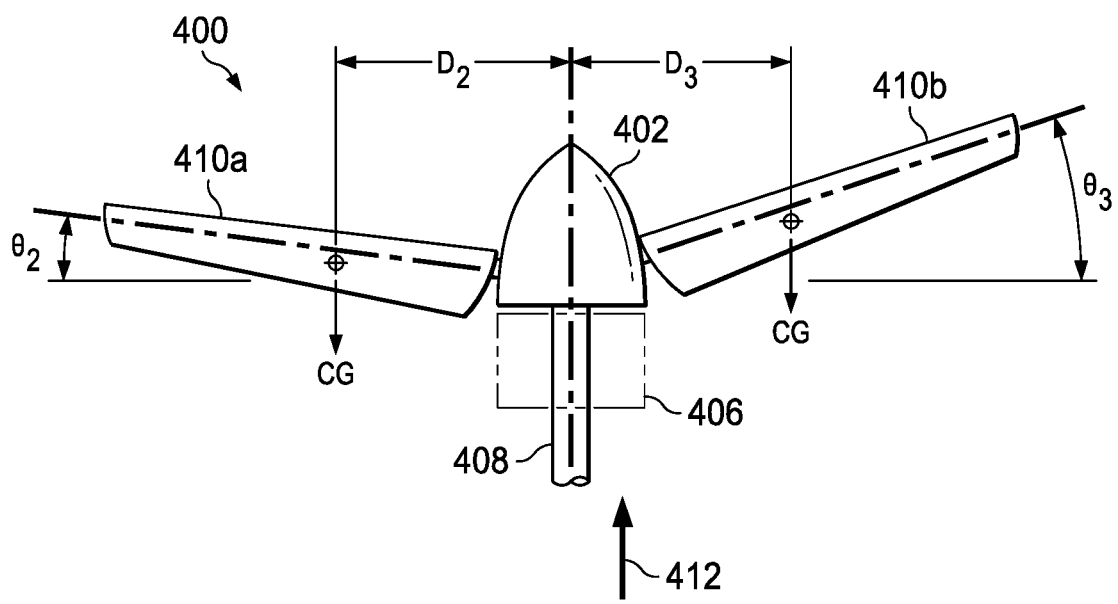
Figure 4C:
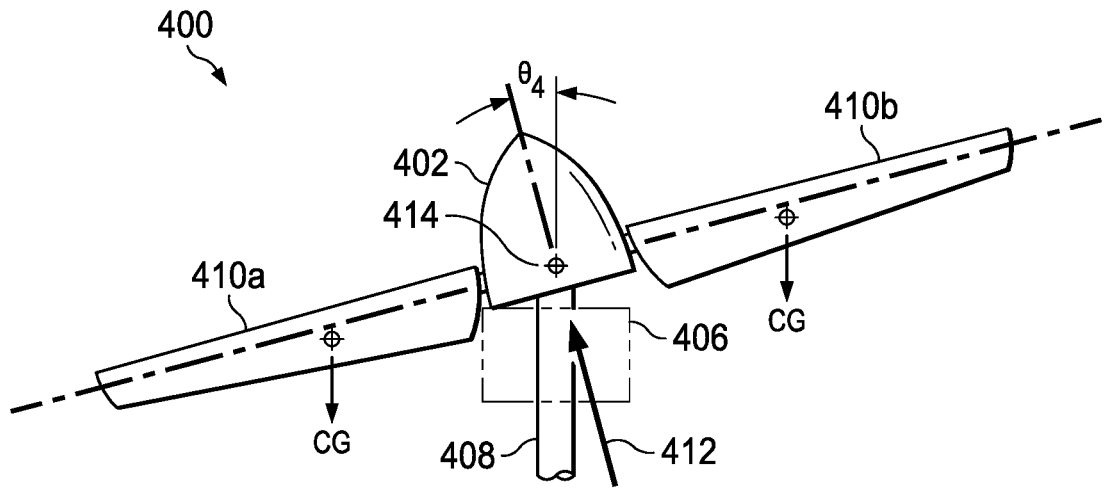

Rigid rotor systems and stiff in-plane rotor system may respond differently to cyclical pitch control. When cyclical pitch is applied to a rigid rotor system, the entire rotor disc can warp (i.e., due to differential coning (or flapping) of the rotor blades). Turning to FIG. 4B, the rotor system 400 in FIG. 4B is a rigid rotor system (i.e., stiff in-plane and out-of-plane). FIG. 4B illustrates the rotor system 400 wherein the rotor blades 410a and 410b exhibit differential coning. The rotor blade 410a cones at an angle $\theta_2$ and the rotor blade 410b cones at an angle $\theta_3$. The coning angles $\theta_2$ and $\theta_3$ are different from one another (i.e., $\theta_2 < \theta_3$). In this case, the CG of each of the rotor blades 410a and 410b is not equidistant from the centerline of the mast 408. The CG of the rotor blade 410a is a distance D2 from the centerline of the mast 408 and rotor blade 410b is a distance D3 from the centerline of the mast 408. The distances D2 and D3 are different from one another (i.e., D3<D2). Such differential coning offsets the thrust vector 412 (generated by the rotation of the rotor blades 410a and 410b) away from the centerline of the mast 408 and, thereby, creates a moment. This moment may be used, e.g., to control the direction of the aircraft. However, the rotor system must support the moment, which may require a very rigid structural material (which are often dense and thereof heavy) and/or a large amount of structural material to accommodate such a moment. When cyclical pitch is applied to a stiff in-plane rotor system, the entire rotor disc tilts. Turning to FIG. 4C, the rotor system 400 in FIG. 4C is a stiff in-plane rotor system (i.e., stiff in-plane and soft out-of-plane). In this case, a rotor hub (inside the housing 402) is gimbaled so that so it can rotate the housing and the rotor blades 410a and 410b a center 414 of the hub. In this case the cyclical pitch causes the hub and the rotor blades 410a and 410b to tilt to at an angle $\theta_4$ (e.g., an equilibrium angle for the rotor blades based, in part, on the particular torque applied to the rotor blades by an engine). The thrust vector 412 generate by the rotor blades 410a and 410b is also tilted at the angle $\theta_4$. Tilting the entire thrust vector can provide a stronger force for controlling the direction of the aircraft (e.g., relative to the control moment induced by a rigid rotor system of FIG. 4B). In some cases, tilting the thrust vector can introduce leading and/or lagging forces in the rotor blades due, in part, to the Coriolis effect. Thus, the rotor blades must support (resist) the forces induces by the Coriolis effect (which may require more structural material to increase rigidity).

In short, cyclical pitch may cause the rigid rotor systems to differentially cone (and not collectively cone), which may introduce moments that necessitate more structural rigidity (and therefore more cost and weight). Some stiff in-plane rotor systems may have an advantage of improved thrust (e.g., relative to rigid rotor systems) but may suffer from forces induces by the Coriolis effect. A potential solution is to design a rigid rotor system (e.g., despite the aforementioned inefficiency relative to stiff in-plane rotor systems) to avoid the Coriolis forces. This technique may only be practical with very specialized materials (e.g., ultra-lightweight and strong materials such as nanomaterials). Moreover, using a rigid rotor system to avoid the Coriolis forces can cause the collective loads to be more severe. In such a case, the collective loads generate a large vertical moment at the root of all the blades, which results in large forces bending in the blades and creates large tension loads in spar and blade skins.

The apparatuses, rotor assemblies, rotor hubs, and rotorcraft described in the present disclosure address the challenges described above (as well as others). In one aspect, a rotor assembly comprises a rotor hub configured to rotate based on rotation of a mast; a first rotor blade configured to pivotally attach to the rotor hub; a bracing member configured to pivotally attach to the rotor hub at a first end and to pivotally attach to the rotor blade at a second end; and a linkage mechanism coupling the rotor blade to a second rotor blade. The bracing member is configured to transfer a coning movement of the rotor blade to a movement of the linkage mechanism and a corresponding coning movement of the second rotor blade. For example, the rotor system 400 of FIG. 4D prevents differential coning (flapping) and enforces collective coning.

Figure 4D:
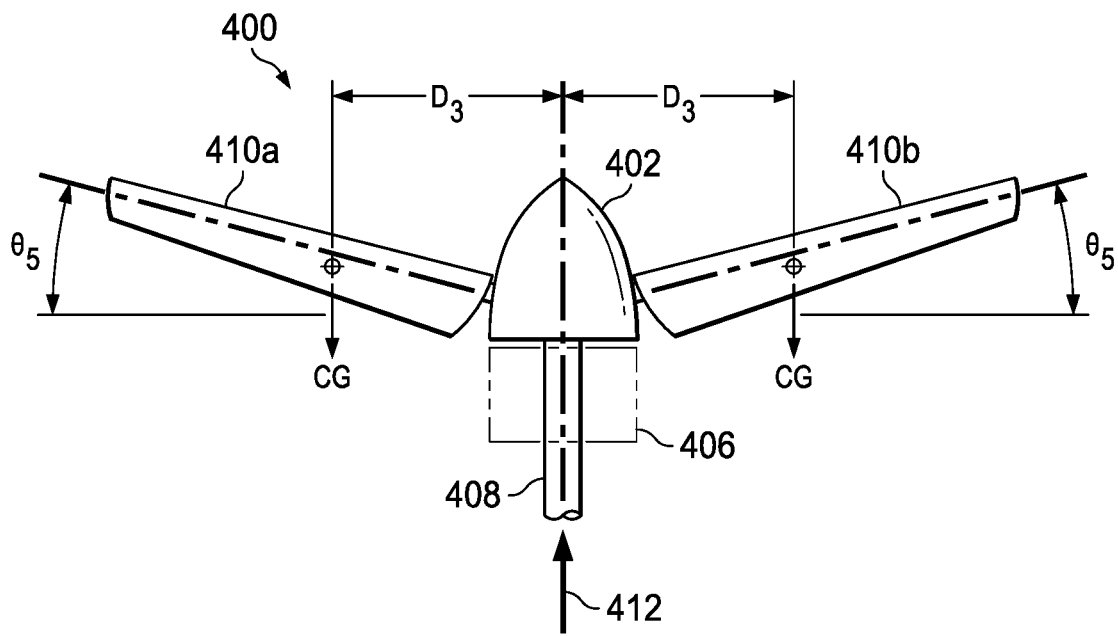

Turning to FIG. 4D, the rotor system 400 of FIG. 4D is a stiff in-plane rotor system (i.e., stiff in-plane and soft out-of-plane). A rotor hub (inside the housing 402) is gimbaled so that so it can rotate the housing and the rotor blades 410a and 410b a center 414 of the hub. In addition, the rotor system 400 (of FIG. 4D) includes bracing member and a linkage mechanism as disclosed herein to couple the rotor blade 410a to the rotor blade 410b (and other rotor blades of the rotor system 400). The bracing member and the linkage mechanism transfer a coning movement of the rotor blade 410a to a movement of the linkage mechanism and a corresponding coning movement of the rotor blade 410b. The coupling provided, in part, by the bracing member and the linkage mechanism prevents the rotor blades 410a and 410b from differentially coning (i.e., independent from one another). Instead, cyclical pitch can cause the rotor blades 410a and 410b to collectively cone at an angle $\theta_5$ (e.g., an equilibrium angle for the rotor blades based, in part, on the particular torque applied to the rotor blades by an engine). In this case the center of gravity (CG) of each of the rotor blades 410a and 410b is equidistant from a centerline of the mast 408 (i.e., each is a distance D4 from the centerline of the mast 408 and rotor blade 410b). Thus, the thrust vector 412 generated by the rotation of the rotor blades 410a and 410b is collinear with the centerline of the mast 408. Advantageously, the rotor system 400 of FIG. 4D prevents differential coning (flapping) and enforces collective coning and, consequently, avoids inducing a moment (e.g., as illustrated in FIG. 4B). Moreover, while the rotor system 400 of FIG. 4D is a stiff in-plane rotor system it does not introduce Coriolis effects (e.g., as illustrated in FIG. 4C). Thus, the rotor system 400 of FIG. 4D provides some benefits of coning (e.g., lighter blades) while avoiding some potential challenges associated with coning (e.g., Coriolis effects). Moreover, because this system prevents flapping, it also avoids any delta-three constraints.

FIGS. 5, 6, 7A, 7B, 7C, 8A, and 8B illustrate detailed views of the rotor assembly 300 (of FIG. 3), in accordance with some embodiments of the present disclosure. As discussed with respect to FIG. 3, the rotor assembly 300 comprises a mast 304, a fixed housing 306, a shell 302, and a plurality of rotor blades 308 (i.e., rotor blades 308a, 308b, 308c, and 308d). The description of these components is not repeated here only for the sake of brevity. Advantageously, the rotor system 300 prevents differential coning (flapping) and enforces collective coning (e.g., collective coning similar to that as illustrated in FIG. 4D).

The shell 302 encloses at least a portion of the rotor assembly 300. In addition, the shell 302 comprises a plurality of openings through which roots of the rotor blades extends. The rotor blades 308a-d (i.e., 308) comprise roots 608a-d (i.e., 608) and centrifugal force (CF) retention bearings 614a-d (i.e., 614). The roots 608 are configured to facilitate pivoting the rotor blades 308 about their pitch change axis (based on a coupling to a pitch horn). The CF retention bearings 614 are coupled, at one end, to the rotor blades 308 and, at an opposite end, to a coning pivot point on an inboard bearing support. The inboard bearing support comprises plates 710a-d (also referred to herein as plates 710), a sleeve 714, and elastomeric bearing 716a-d. The sleeve wraps around the rotor hub 626. Each of the plates 710 comprises an opening thought which the CF retention bearings 614 and the elastomeric bearings 716 extend. In addition, each of the plates 710 is pivotally coupled to the sleeve 714. The elastomeric bearings are coupled to the sleeve 714. In this example, the CF retention bearings 614 comprise tension/torsion straps. However, other CF retention bearings may be used. An outboard bearing support 612a-d (i.e., 612) is configured to couple an end of a bracing member to the roots 608 of the rotor blades 308. The outboard bearing support 612 comprises a sleeve and elastomeric shear bearings 624a-d (i.e., 624) and 616a-d (i.e., 616) coupled to the sleeves. The sleeves are configured to support the root of the rotor blade. Each of the sleeves comprises a ball bearing located proximate an inner surface of the sleeve. The ball bearings are configured to facilitate (rolling) movement between the sleeves and the roots 608 of the rotor blades 308. This enables the outboard bearing support 612 to translate along a length of the roots 608 as the rotor blades 308 collectively cone. The elastomeric shear bearings 624a-d (i.e., 624) and 616a-d (i.e., 616) on leading and lagging sides of each root 608 of the rotor blades 308. The elastomeric shear bearings 624 and 616 are configured to generate a shear resistance (e.g., shear spring response) based on coning movement of the rotor blade (308) and configured to generate a resistance (e.g., shear spring response) based on coning movement of the rotor blade (308) (e.g., vertical coning in the orientation illustrated in the FIGS. 5, 6, and 7). Each of the elastomeric shear bearings 624 and 616 comprises alternating layers of an elastomer and a stiff material metal. The elastomer may comprise any rubber-like material. For example, the elastomer may comprise natural rubber (i.e., derived from latex), synthetic rubber (e.g., ethylene propylene diene monomer (EPDM) rubber or any other derived from petroleum), silicone rubber (e.g., a silicon polymer containing oxygen, carbon, and/or hydrogen). The rigid material may comprise metal (e.g., steel, aluminum, an alloy), a composite material (e.g., carbon fiber reinforced polymer), or any other rigid material. When compressed (e.g., due to leading and lagging movement of the blades), each of the elastomeric shear bearings exhibits properties of a very stiff spring (e.g., theoretically "infinite" stiff compression spring.) When sheared (e.g., due to leading and lagging movement of the blades), each of the elastomeric shear bearings exhibits properties of a shear spring (e.g., generating an opposing shear force in response to a shear displacement).

Figure 5:
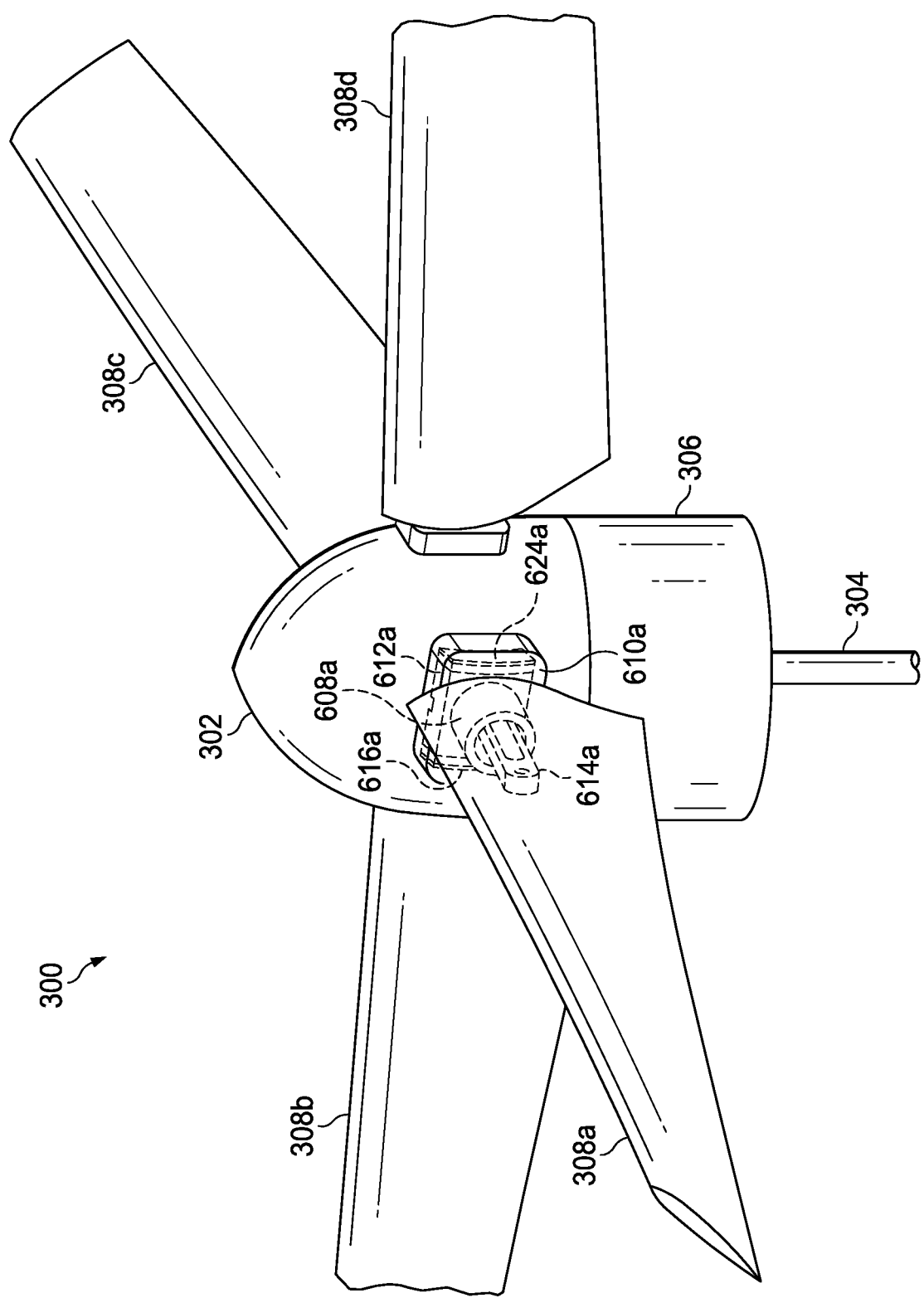
FIGS. 5, 6, 7A, 7B, 7C, 8A, and 8B illustrate detailed views of the rotor assembly of FIG. 3, in accordance with some embodiments of the present disclosure.

Turning to FIG. 5, FIG. 5 illustrates the rotor assembly 300 with the rotor blade 308a removed. The rotor blade 308a being removed exposes one of the openings (i.e., an opening 610a) through which the root 608a of the rotor blade 308a extends. The CF retention bearing 614a extends through the root 608a. The opening 610a comprises a ledge surrounding the opening; the ledge not only stiffens the shell 302 around the opening 610a but also limits movement of the rotor blade 308a. The outboard bearing support 612a and the elastomeric shear bearings 624a and 616a substantially fill (i.e., in a laterally direction) the opening 610a around the root 608a. Each of the elastomeric shear bearings 624a and 616a contacts and bears on the ledge around the opening. Thus, any coning (e.g., vertical) movement of the root 608a causes a shear force reaction in the elastomeric shear bearings 624a and 616a (e.g., based on friction between an outermost surface of the elastomeric shear bearings 624a and 616a and the ledge and the shearing movement of the rotor blade 308a). In addition, when rotor blade 308a is at rest (or at low rotor blade speeds), the ledge around the opening 610a provides a hard stop (to limit downward motion of the rotor blade 308a) and at least in part supports the weight of the rotor blade 308a. During operation, the ledge around the opening 610a provides a hard stop (to limit coning motion of the rotor blade 308a) and at least in part supports the force generated by the coning motion of the rotor blade 308a. Because the shell 302 supports these loads (and others) the shell is made of a rigid material and includes structural members to reinforce the shell. The shell can transfer these loads to the structural members. The structural members and other component are illustrated in more detail in FIG. 6.

Figure 6:
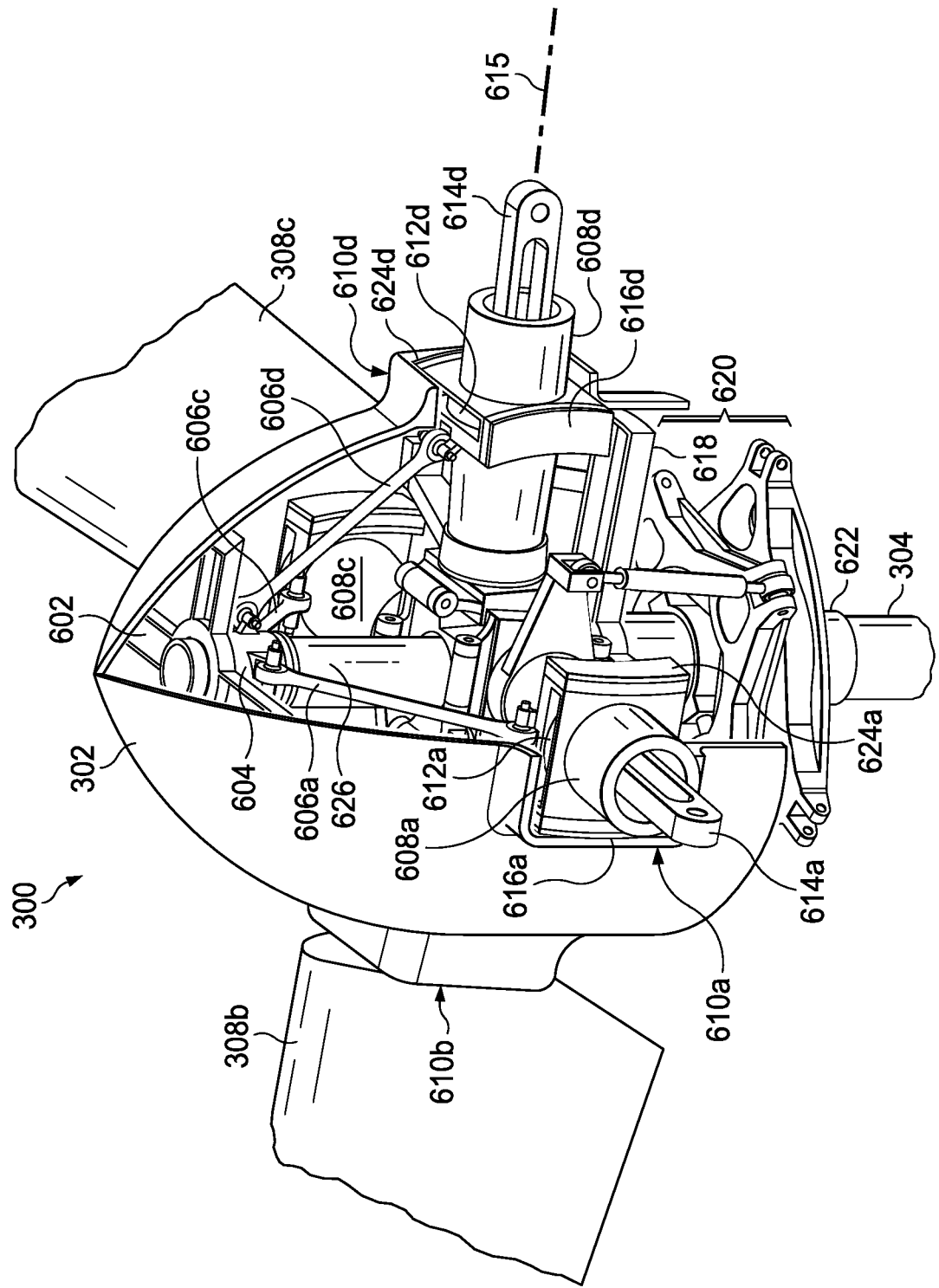

Turning to FIG. 6, FIG. 6 illustrates a view with a partial cutaway of the shell 302 of the rotor assembly 300 and with the rotor blades 308a and 308d and the fixed housing 306 removed. This view illustrates additional components that facilitate a coning relief solution of the present disclosure.

As described above, the shell 302 supports structural loads and includes structural members 602 and 618 to reinforce the shell. Each of the structural members 602 and 618 includes a plurality of braces (in this case four) that extend to and support a wall of the shell 302 loads from the shell 302 are transferred to the structural members 602 and 618 includes. The structural members 602 and 618 transfer the loads to a rotor hub 626. The structural member 618 supports the shell 302 near an end of the rotor hub 626 proximate the mast 304. The structural member 602 supports the shell 302 near an end of the rotor hub 626 distal the mast 304.

The rotor hub 626 extends from the mast 304. The rotor hub 626 is configured to rotate based on rotation of the mast 304. As described above, each of the rotor blades 308 comprises a root 608 configured to facilitate pivoting the rotor blades 308 about their pitch change axis and the CF retention bearings 614 coupling each of the rotor blades 308 to a coning pivot point on an inboard bearing support. The root 608d facilitates pivoting the rotor blade 308d about a pitch change axis 615. The CF retention bearing 614d couples the rotor blade 308d to a coning pivot point on the inboard bearing support, which is attached to the rotor hub 626. It is noted that tension/torsion straps can be used or any other CF retention bearing. An inboard bearing support couples the rotor blade 308d to the rotor hub 626.

In addition to being supported at a coning pivot point, the rotor blades 308 are supported by bracing members 606a-d (i.e., 606). A support 604 is affixed to the rotor hub 626. The support 604 comprises hinges for attaching the bracing members 606. Each of the bracing members 606 pivotally attaches, at a first end, to the rotor hub 626 (i.e., at a hinge on the support 604). Each of the bracing members 606 pivotally attaches, at a second end, to a root of the rotor blade (i.e., at the outboard bearing support 612. For example, the bracing member 606d pivotally attaches, at a first end, to the rotor hub 626 via a hinge on the support 604 and pivotally attaches, at a second end, to the root 608d of the rotor blade 308d via at the outboard bearing support 612d. The roots 608 of the rotor blades 308 extend through the outboard bearing supports 612, which are supported by the openings 610. For example, the root 608d of the rotor blade 308d extends through the outboard bearing support 612d, which is supported by the opening 610d. Each of the elastomeric shear bearings 624d and 616d contact and bear on the ledge around the opening 610d.

A linkage mechanism couples the rotor blades 308 to one another. The linkage mechanism comprises a gimbaled swashplate assembly 620 and a plurality of linkage members. The linkage members couple the gimbaled swashplate assembly 620 to each of the rotor blades 309. A gimbaled swashplate assembly 620 comprises plates separated by a ball bearing that is stiff with respect to axial load and with respect to moments. The gimbaled swashplate assembly 620 slides (translates) along the splined sleeve 622, which is attached to the mast 304 and can tilt relative to the splined sleeve 622 (e.g., such that the angle of tilt can vary). The tilting and translating of the gimbaled swashplate assembly 620 creates vertical shears at linkage members (e.g., the pitch horn and pitch link), which changes the angle of attack of the corresponding blade. The gimbaled swashplate assembly 620 couples the mast 304 to the rotor hub 626, at least in part, by transferring rotational of the mast 304 to the rotor hub 626. The rotor hub is about to rotate at least a portion of the components coupled to the rotor hub 626 based on movement of the gimbaled swashplate assembly 620. The gimbaled swashplate assembly 620 and linkage members are described further below with respect to FIGS. 7A-C. Kinematic interactions between the bracing members 606, the coning pivot hinges, and the linkage mechanisms help to transfer coning movement from one the rotor blades 308 to a corresponding coning movement in others of the rotor blades 308. Advantageously, these kinematic interactions prevent the rotor blades 308 from differentially coning (i.e., independent from one another) and, instead, force the rotor blades 308 to collectively cone.

Figure 7A:
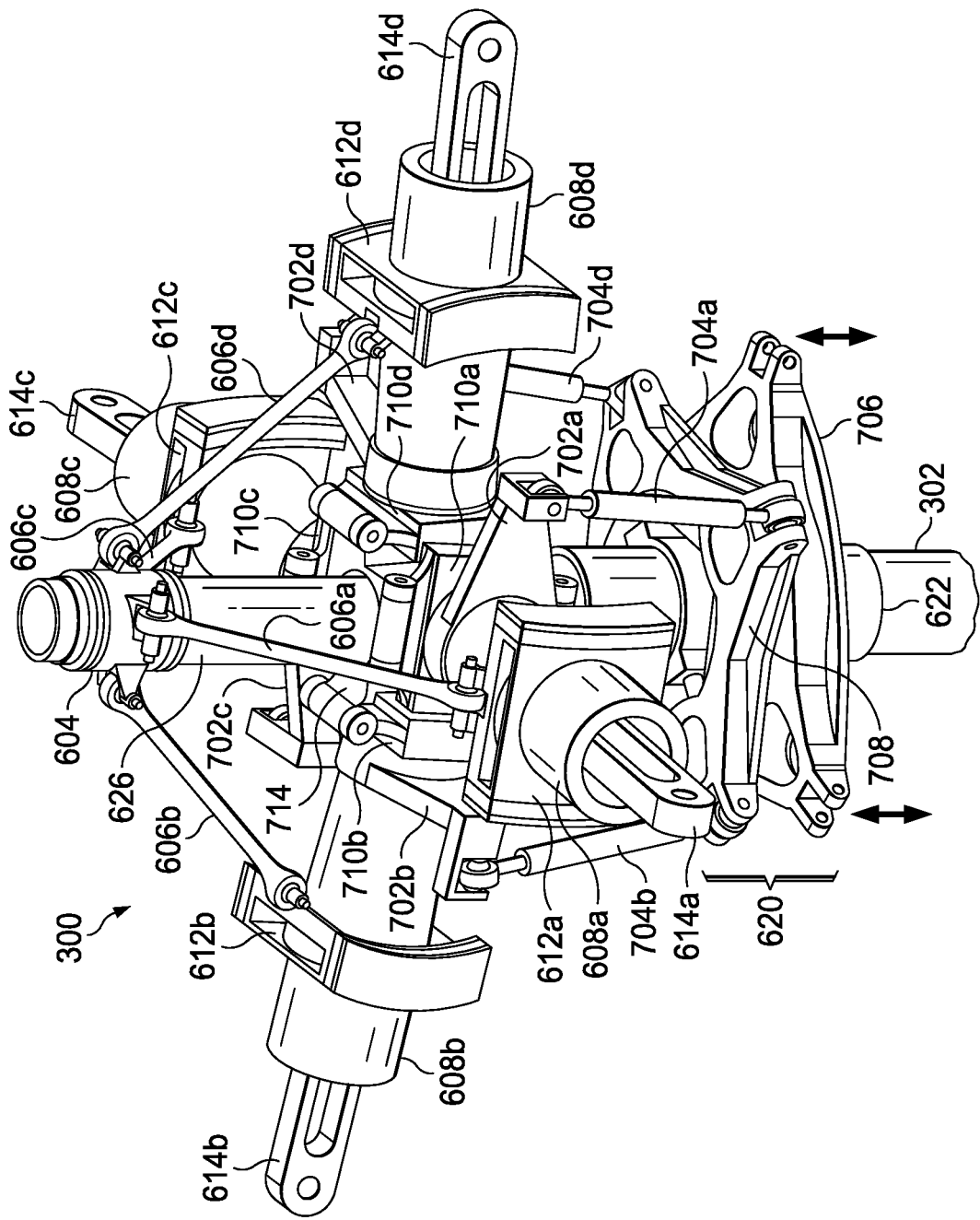
Figure 7B:
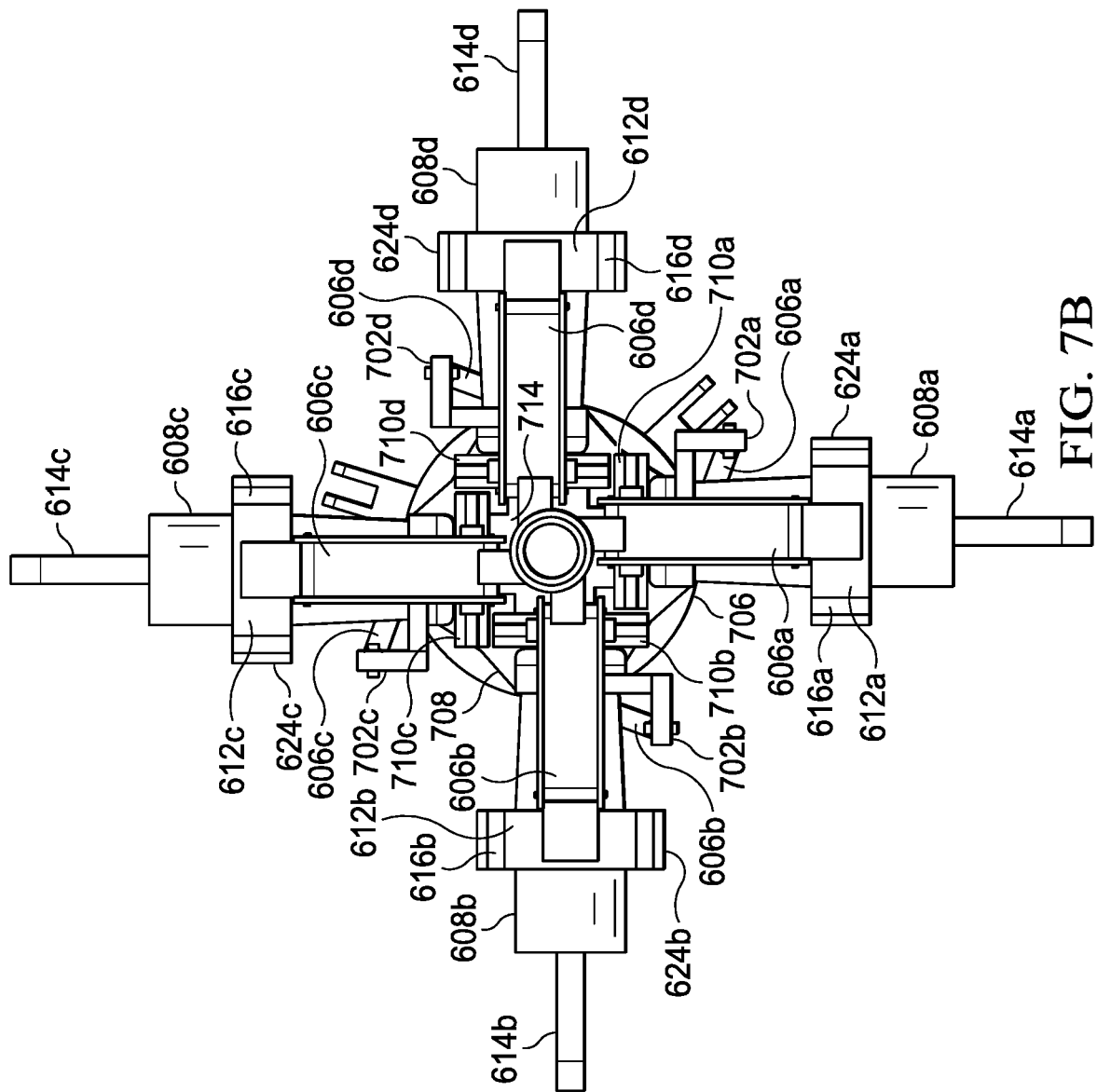
Figure 7C:
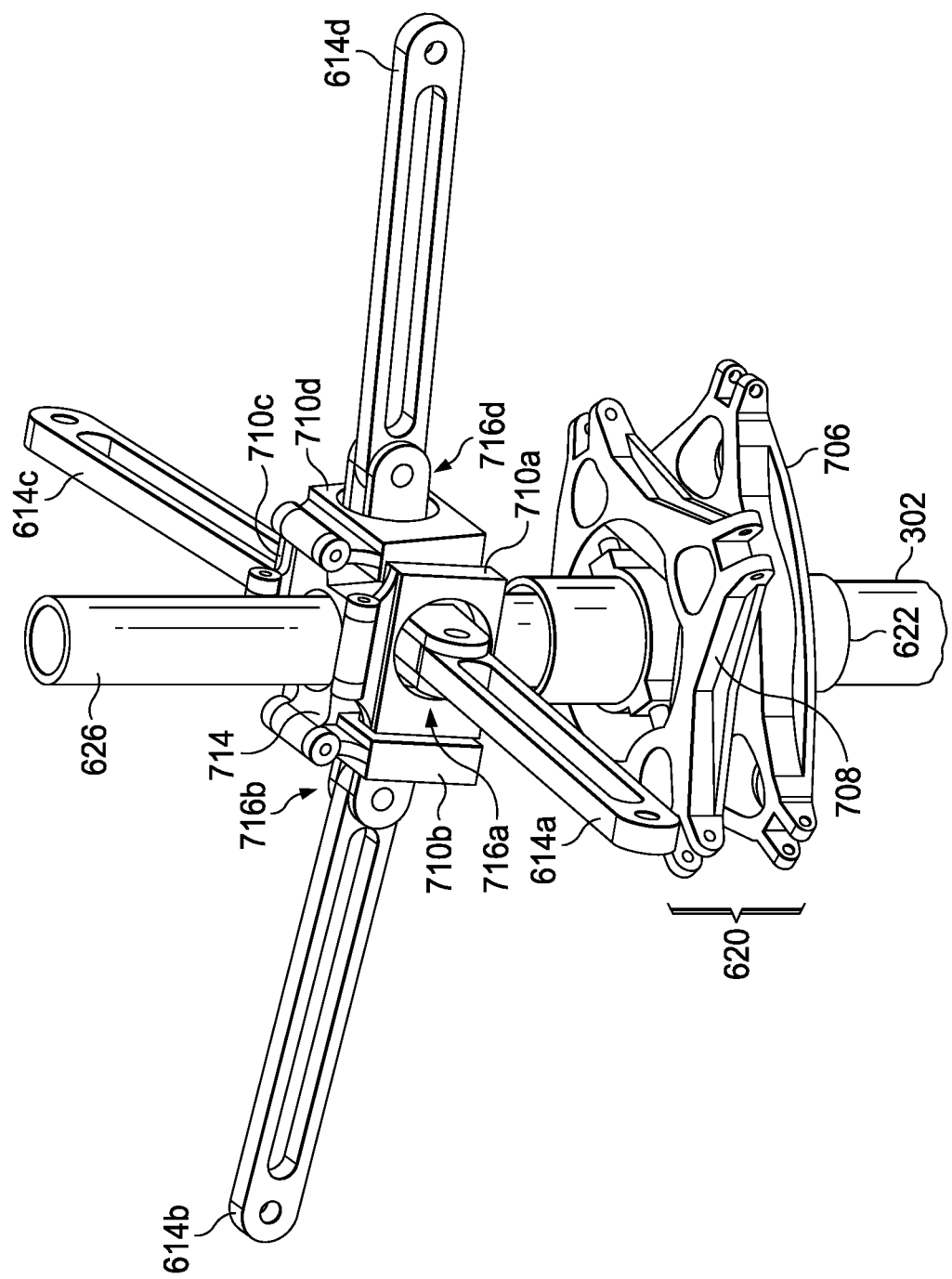

FIGS. 7A and 7B illustrate views of the rotor assembly 300 and with all the rotor blades 308, the fixed housing 306, and the structural members 602 and 618 removed (i.e., solely to reveal some of the components and for clarity of the Figures). FIG. 7B illustrates a top view of the system as illustrated in FIG. 7A. FIG. 7C is a view of the rotor assembly 300 and with further components removed to illustrate details of the inboard bearing supports.

The rotor blades 308 comprises CF retention bearings 614 coupling the rotor blades 308 to coning pivot points on inboard bearing supports. The inboard bearing support comprises the plates 710, the sleeve 714, and the elastomeric bearings 716. The sleeve 714 wraps around the rotor hub 626. Each of the plates 710 comprises an opening though which the elastomeric bearings 716 extend. In addition, each of the plates 710 is pivotally coupled to the sleeve 714. The elastomeric bearings 716 are coupled to the sleeve 714. The elastomeric bearings 716 are configured to support a load generated between the rotor blade to the rotor hub. In this example, the elastomeric bearings 716 comprise flanges. The flanges may comprise an elastomeric material. In some examples, the flanges are coupled to one or more inserts comprising an elastomeric material (e.g., to support one or more loads associated with centrifugal force). The CF retention bearings 614 are pivotally coupled to the elastomeric bearings 716 though the coning pivot points (e.g., a fastener extending though the flanges and the CF retention bearings 614). All the rotor blades 308 are coupled to rotating control system comprising the gimbaled swashplate assembly 620 and one or more actuators to control movement of the gimbaled swashplate assembly 620. A pilot can use the actuators to control the gimbaled swashplate assembly 620 and, thereby, control the thrust vector of the produced by the rotor assembly 300, which in part determines the direction of the aircraft.

The gimbaled swashplate assembly 620 comprises a non-rotating plate 706 and a rotating plate 708. The actuators translate and tilt the non-rotating plate 706, which causes corresponding translations and tilting in the rotating plate 708. Generally, because the rotating plate 708 rotates, tilting the non-rotating plate 706 causes cyclical controls while translating the non-rotating plate 706 causes collective controls. Pitch horns 702a-d (i.e., 702) are attached to the roots 608 of each of the rotor blades. The pitch horns are linkage members. The pitch horns 702 are configured to control the pitch of the rotor blades 308 by applying a torque to the roots 608 to rotate them about their pitch change axis. Pitch links 704a-d (i.e., 704) couple the pitch horns 702 to the rotating plate 708. Because the rotating plate 708 is coupled to the pitch horns 702 by the pitch links 704, movement of the rotating plate 708 causes the pitch horns 702 to rotate, which, in turn causes the rotor blades 308 to change pitch (i.e., increase or decrease pitch). When the actuator moves the gimbaled swashplate assembly 620 axially along the mast 304, all the rotor blades collectively pitch (i.e., the pitch angle is approximately the same for all blades). When the actuator tilts the gimbaled swashplate assembly 620 relative to the mast, the pitch angle of each blade varies cyclical depending on where it is in a cycle of rotation about the mast A distance between the pitch-cone coupling mechanism (i.e., the ball joint linking the pitch horns 702 and the pitch links 704) and a pitch change axis of the rotor blade sets a relationship between pitching and coning (i.e., delta-zero). In this example, the rotor assembly 300 is illustrated with approximately 30 degrees of positive delta-zero (at each of the four pitch-cone coupling mechanisms). The positive delta-zero of the rotor assembly advantageously reduces an air gust response when coning. For example, coning up results in a reduction in blade pitch to counteract the negative effects of an air gust or turbulent air on the performance of the rotor assembly 300. For example, when the blade cones, the thrust increases due to the vector sum of the lift and Centrifugal forces resulting in an increase in the vertical shear at the blade roots.

Figure 8A:
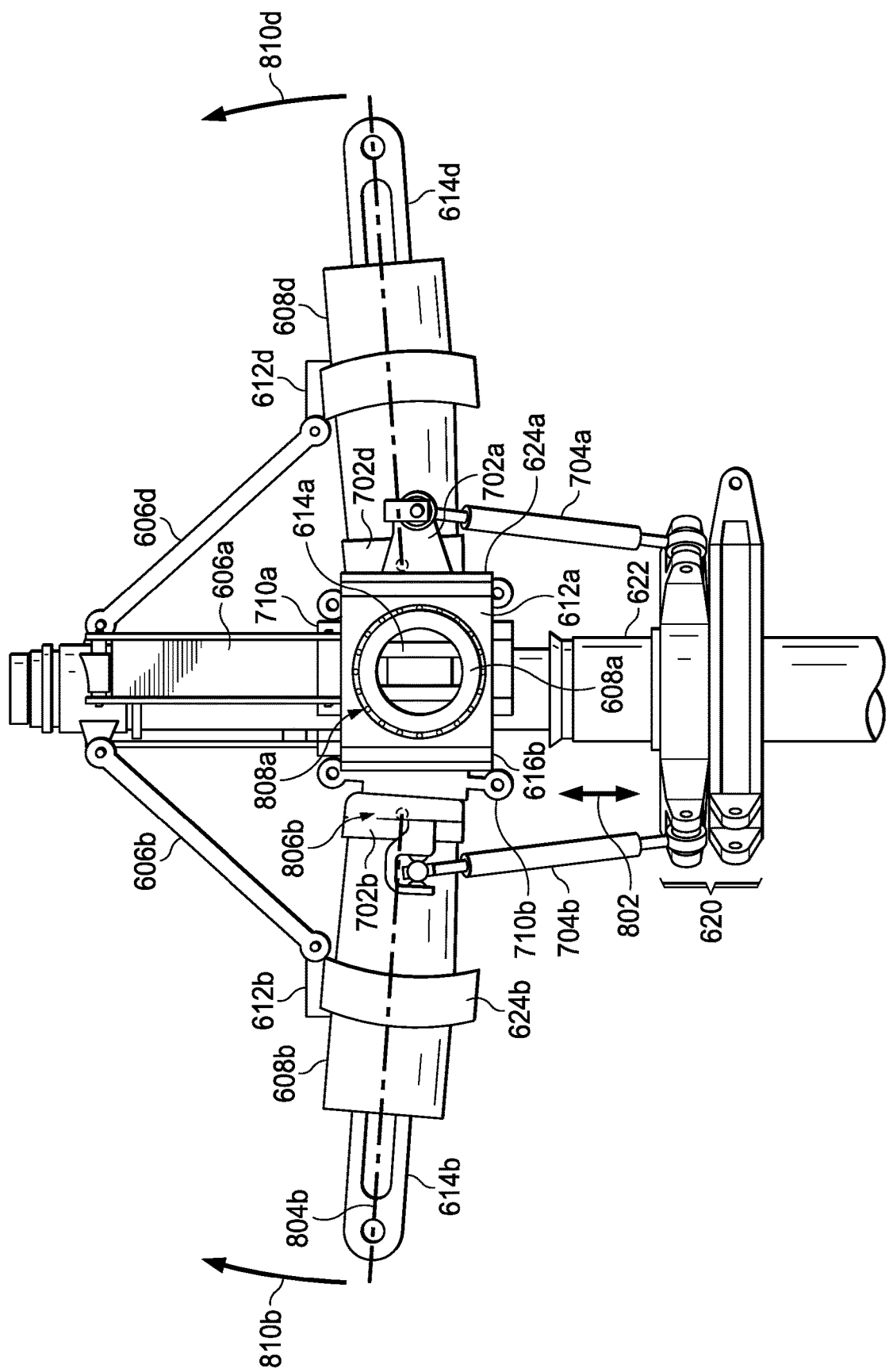
Figure 8B:
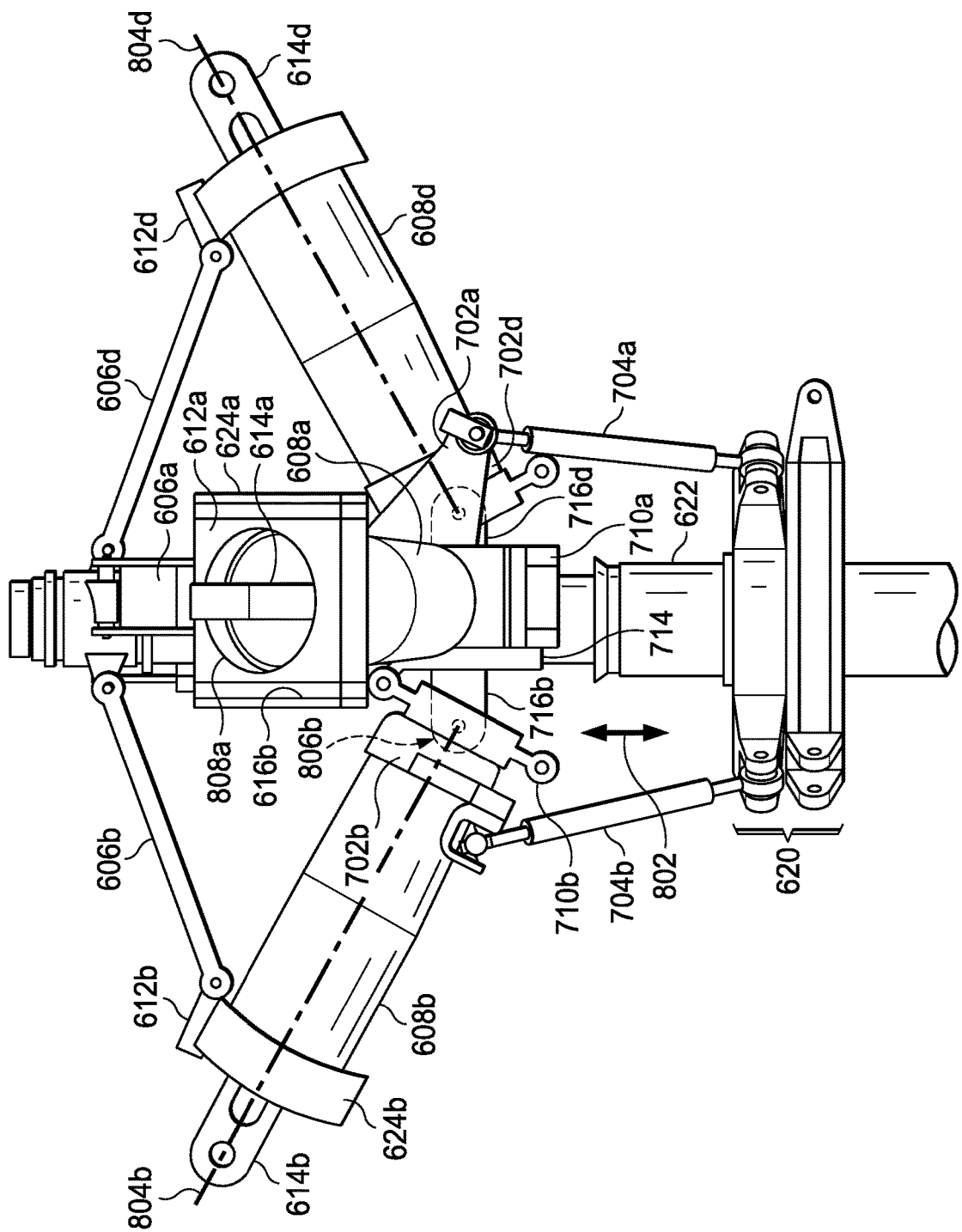

Turning to FIGS. 8A and 8B, FIG. 8A and 8B illustrates side views of the rotor assembly 300. FIG. 8A illustrates the rotor assembly 300 with no coning; FIG. 8B illustrates the rotor assembly 300 with approximately X degrees of coning. Kinematic interactions between the bracing members 606, the coning pivot hinges, and the connection between the pitch horn and the gimbaled swashplate assembly 620 help to transfer coning movement from one the rotor blades 308 to a corresponding coning movement in others of the rotor blades 308. Advantageously, these kinematic interactions prevent the rotor blades 308 from differentially coning (i.e., independent from one another) and, instead, enforces the rotor blades 308 to collectively cone to avoid generating Coriolis effect. In addition, the kinematic interactions allow the coning to change on all the blades at the same time in response to a change in rotor blade speed (e.g., revolutions per minute) or net rotor thrust. For example, FIGS. 8A and 8B illustrate, among other things, that the rotor blades (i.e., via the roots 608) cone about coning pivot points 806a-d (i.e., 806). The coning pivot points 806 correspond to pivot points of the elastomeric bearings 716. The axes 804a-d (i.e., 804) are a pitch change axis of the blade. As the rotor blades cone (e.g., as generally indicated by coning directions 810a-d), the rotor blades pivot about the coning pivot points 806. Sleeves of the outboard bearing supports 612 support the roots 608 of the rotor blades. Each of the sleeves comprises a ball bearing 808a-d (i.e., 808) located between an inner surface of the sleeves and the roots 608. The ball bearings are configured to facilitate (rolling) movement between the sleeves and the roots. This enables the outboard bearing supports 612 to translate along a length of the roots 608 as the rotor blades cone.

When coning (e.g., as shown in FIG. 8B), each rotor blade cones about the coning pivot points 806 and, simultaneously, the outboard bearing supports 612 and the bracing members 606 guide the coning of the rotor blades. As a result, a shear force is developed between the coning pivot points 806 and outboard bearing supports 612 during coning. This shear force may push or pull on the roots 608 between the coning pivot points 806 and outboard bearing supports 612. If the rotor blades were able to move independently from one another (which is not the case in the rotor assembly 300), this shear force would only be experienced by the particular rotor blade in which it develops. However, because each of the rotor blades is coupled to one another by a linkage mechanism, the shear developed in one of the roots 608 is translated in others of the roots 608. The shear has a load path that translates the coning movement from one rotor blade to a corresponding collective coning movement in all the rotor blades. The linkage mechanism includes the gimbaled swashplate assembly 620, the pitch horns 702, the pitch links 704. The shear developed in the roots 608 is translated through the pitch horns 702 to the pitch links 704; the pitch links 704 transfer the load into the gimbaled swashplate assembly 620, which may translate along the splined sleeve 622 (e.g., as generally indicated by 802). Because the gimbaled swashplate assembly 620 is coupled to all the roots 608 by pitch links 704 and pitch horns 702, its translation along the splined sleeve 622 pushes/pulls on all the other roots, which causes collective coning (and/or a pitch change, as the case may be).

For example, the outboard bearing support 612b and the bracing member 606b guide the rotor blade 308b as it cones upward about the coning pivot point 806b. As a result, a shear force is developed between the coning pivot point 806b and the outboard bearing support 612d during the coning movement. In this example, this shear force pulls on the root 608b. Because the root 608b is coupled to all the other roots (i.e., 608a, 608c, and 608d) by the linkage mechanism, the shear developed in the root 608b is translated to all the other roots. The shear has a load path through the linkage mechanism that translates the coning movement from the rotor blade 308b (which corresponds to the root 608b) to a corresponding collective coning movement in all the rotor blades (i.e., 308a, 308c, and 308d, which correspond to roots 608a, 608c, and 608d, respectively). The shear developed in the root 608b is transferred through the pitch horn 702b to the pitch link 704b; the pitch link 704b transfers the shear to the gimbaled swashplate assembly 620, which causes the gimbaled swashplate assembly 620 to translate upward along the splined sleeve 622. Because the gimbaled swashplate assembly 620 is coupled to all the other roots by pitch links and pitch horns, its upward translation along the splined sleeve 622 pushes up on all the other roots, which causes collective coning.

The rotor system 300 (of FIGS. 3, 5, 6, 7A, 7B, 7C, 8A and 8B) is operable to attached to and generate thrust for propelling an aircraft. In some examples, each of the rotor systems 211a and 211b of the tiltrotor aircraft 201 (i.e., of FIGS. 2A and 2B) is an instance of the rotor system 300. In such examples, the instances of the rotor system 300 are operably attached to the nacelles 203a and 203b and generate thrust to propel the tiltrotor aircraft 201 in helicopter mode and in airplane mode. The rotor system 300 enforces collective coning when operated in the helicopter mode and when operated in the airplane mode (i.e. regardless ow which mode of operation). Each of the instances of the rotor system can operate independent from the other (e.g., the rotor system operably attached to the nacelle 203a may collective cone at a first coning angle and the rotor system operably attached to the nacelle 203b may collective cone at a second coning angle). In other examples, the rotor system 103 of the rotorcraft 101 (i.e., of FIGS. 1A and 1B) is an instance of the rotor system 300. In such other examples, the instance of the rotor system 300 is operably attached to a mast of the rotorcraft 101, generates thrust to propel the rotorcraft 101, and enforces collective coning.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

In order to assist the United States Patent and Trademark Office (USPTO), and any readers of any patent issued on this application, in interpreting the claims appended hereto, it is noted that: (a) Applicant does not intend any of the appended claims to invoke paragraph (f) of 35 U.S.C. § 112, as it exists on the date of the filing hereof, unless the words "means for" or "steps for" are explicitly used in the particular claims; and (b) Applicant does not intend, by any statement in the specification, to limit this disclosure in any way that is not otherwise expressly reflected in the appended claims.

What is claimed is:

1. A rotor assembly comprising:
   a rotor hub operable to rotate based on rotation of a mast;
   a first rotor blade pivotally attached to the rotor hub;
   a bracing member pivotally attached to the rotor hub at a first end and pivotally attached to the first rotor blade at a second end; and
   a linkage mechanism coupling the first rotor blade to a second rotor blade;
   wherein the bracing member is operable to transfer a coning movement of the first rotor blade to a movement of the linkage mechanism and a corresponding coning movement of the second rotor blade.

2. The rotor assembly of claim 1, further comprising:
   an outboard bearing support operable to couple the second end of the bracing member to a root of the first rotor blade, the outboard bearing support comprising a sleeve operable to support the root of the first rotor blade.

3. The rotor assembly of claim 2, wherein the sleeve of the outboard bearing support comprises:
   a ball bearing operable to facilitate movement between the sleeve and the root of the first rotor blade.

4. The rotor assembly of claim 2, wherein the sleeve of the outboard bearing support comprises:
   an elastomeric shear bearing operable to generate a shear resistance based on the coning movement of the first rotor blade.

5. The rotor assembly of claim 1, further comprising:
   an inboard bearing support operable to pivotally attach the first rotor blade to the rotor hub, the inboard bearing support comprising an elastomeric bearing operable to support a load generated between the first rotor blade and the rotor hub.

6. The rotor assembly of claim 1, further comprising:
   a shell configured to enclose at least a portion of the rotor assembly, wherein the shell comprises an opening configured to limit the coning movement of the first rotor blade.

7. The rotor assembly of claim 6, further comprising:
   structural members operable to reinforce the shell, wherein the shell is operable to transfer a load imposed by the first rotor blade to the structural members.

8. The rotor assembly of claim 1, wherein the linkage mechanism comprises:
a plate operable to translate along the mast; and
a plurality of linkage members comprising:
a first linkage member operable to couple the plate to the first rotor blade, and
a second linkage member operable to couple the plate to the second rotor blade.

9. The rotor assembly of claim 8, wherein the plurality of linkage members comprises a plurality of pitch horns, and wherein:
the first linkage member comprises a first pitch horn, and
the second linkage member comprises a second pitch horn.

10. The rotor assembly of claim 8, further comprising:
a gimbaled swashplate assembly coupling the mast to the rotor hub, wherein the gimbaled swashplate assembly is operable to transfer rotational movement of the mast to the rotor hub and the gimbaled swashplate assembly comprises the plate.

11. A tiltrotor aircraft comprising:
a mast operable to rotate based on torque applied by an engine;
a rotor hub operable to rotate based on rotation of the mast;
a first rotor blade and a second rotor blade pivotally attached to the rotor hub;
a bracing member pivotally attached to the rotor hub at a first end and pivotally attached to the first rotor blade at a second end;
a linkage mechanism coupling the first rotor blade to the second rotor blade; and
wherein the bracing member is operable to transfer a coning movement of the first rotor blade to a movement of the linkage mechanism and a corresponding coning movement of the second rotor blade.

12. The tiltrotor aircraft of claim 11, further comprising:
an outboard bearing support operable to couple the second end of the bracing member to a root of the first rotor blade, the outboard bearing support comprising a sleeve operable to support the root of the first rotor blade.

13. The tiltrotor aircraft of claim 11, further comprising:
an inboard bearing support operable to pivotally attach the first rotor blade to the rotor hub, the inboard bearing support comprising an elastomeric bearing operable to support a load generated between the first rotor blade and the rotor hub.

14. The tiltrotor aircraft of claim 11, wherein the linkage mechanism comprises:
a plate operable to translate along the mast; and
a plurality of linkage members comprising:
a first linkage member operable to couple the plate to the first rotor blade, and
a second linkage member operable to couple the plate to the second rotor blade.

15. The tiltrotor aircraft of claim 14, wherein the plurality of linkage members comprises a plurality of pitch horns, and wherein:
the first linkage member comprises a first pitch horn, and
the second linkage member comprises a second pitch horn.

16. The tiltrotor aircraft of claim 14, further comprising:
a gimbaled swashplate assembly coupling the mast to the rotor hub, wherein the gimbaled swashplate assembly is operable to transfer rotational movement of the mast to the rotor hub and the gimbaled swashplate assembly comprises the plate.

17. An tiltrotor aircraft comprising:
a plurality of engines; and
a plurality of rotor assemblies, wherein each of the plurality of rotor assemblies comprises:
a rotor hub operable to rotate based on torque applied by one of the plurality of engines,
a plurality of rotor blades pivotally attached to the rotor hub,
a plurality of bracing members pivotally attached to the rotor hub at a first end and to pivotally attach to one of the plurality of rotor blades at a second end, and
a linkage mechanism coupling the plurality of rotor blades to one another,
wherein one of the plurality of bracing members is operable to transfer a coning movement of one of the plurality of rotor blades to a movement of the linkage mechanism and a corresponding coning movement of others of the plurality of bracing members.

18. The tiltrotor aircraft of claim 17, wherein the linkage mechanism comprises:
a plate operable to translate along a mast; and
a plurality of linkage members operable to couple the plate to the plurality of rotor blades.

19. The tiltrotor aircraft of claim 18, wherein the plurality of linkage members comprises a plurality of pitch horns.

20. The tiltrotor aircraft of claim 19, further comprising:
a gimbaled swashplate assembly coupling the mast to the rotor hub, wherein the gimbaled swashplate assembly is operable to transfer rotational movement of the mast to the rotor hub and the gimbaled swashplate assembly comprises the plate.

* * * * *